Figure 5:
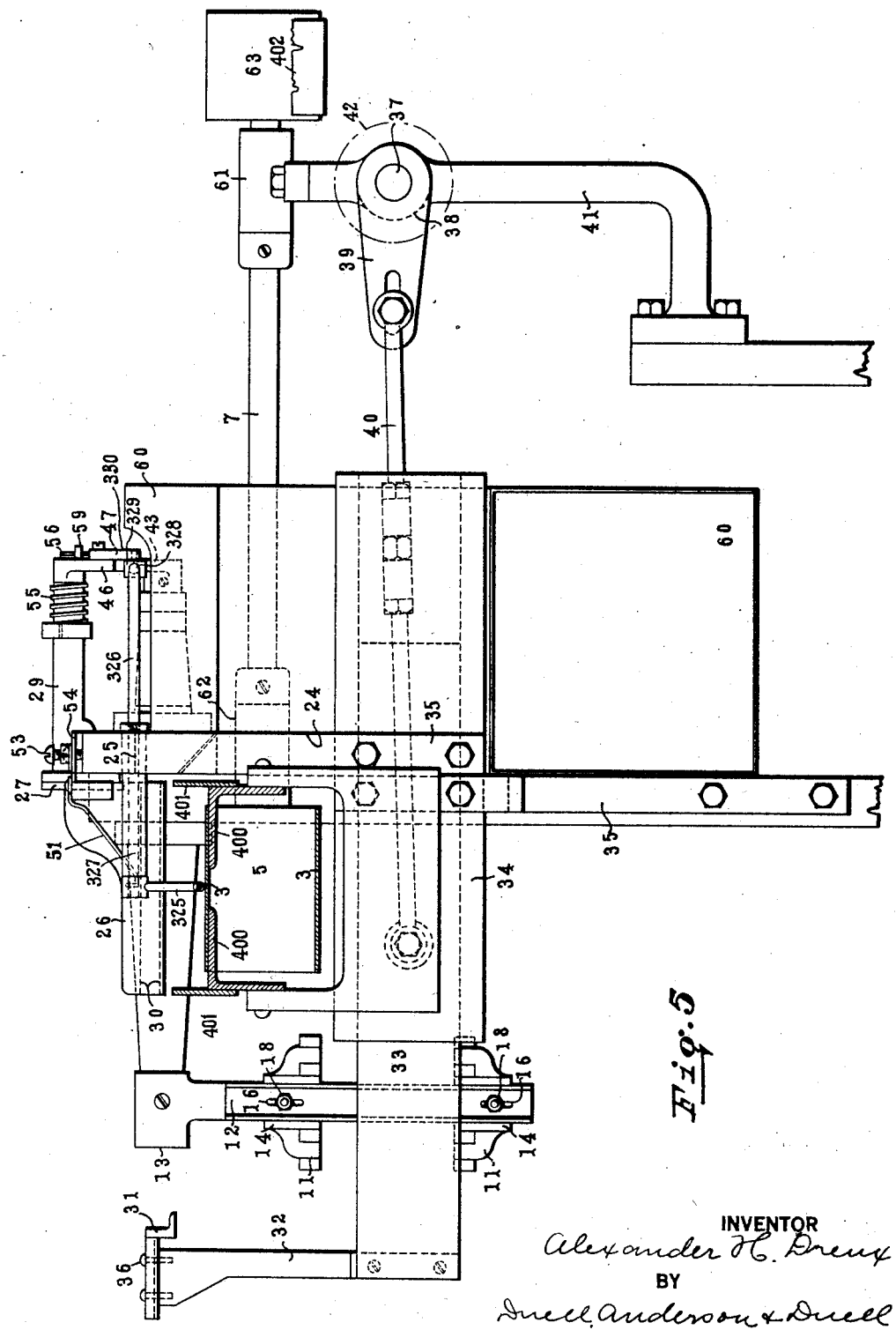

June 4, 1929.  A. H. DREUX  1,715,354
BOX MACHINE
Original Filed July 17, 1925  6 Sheets-Sheet 1
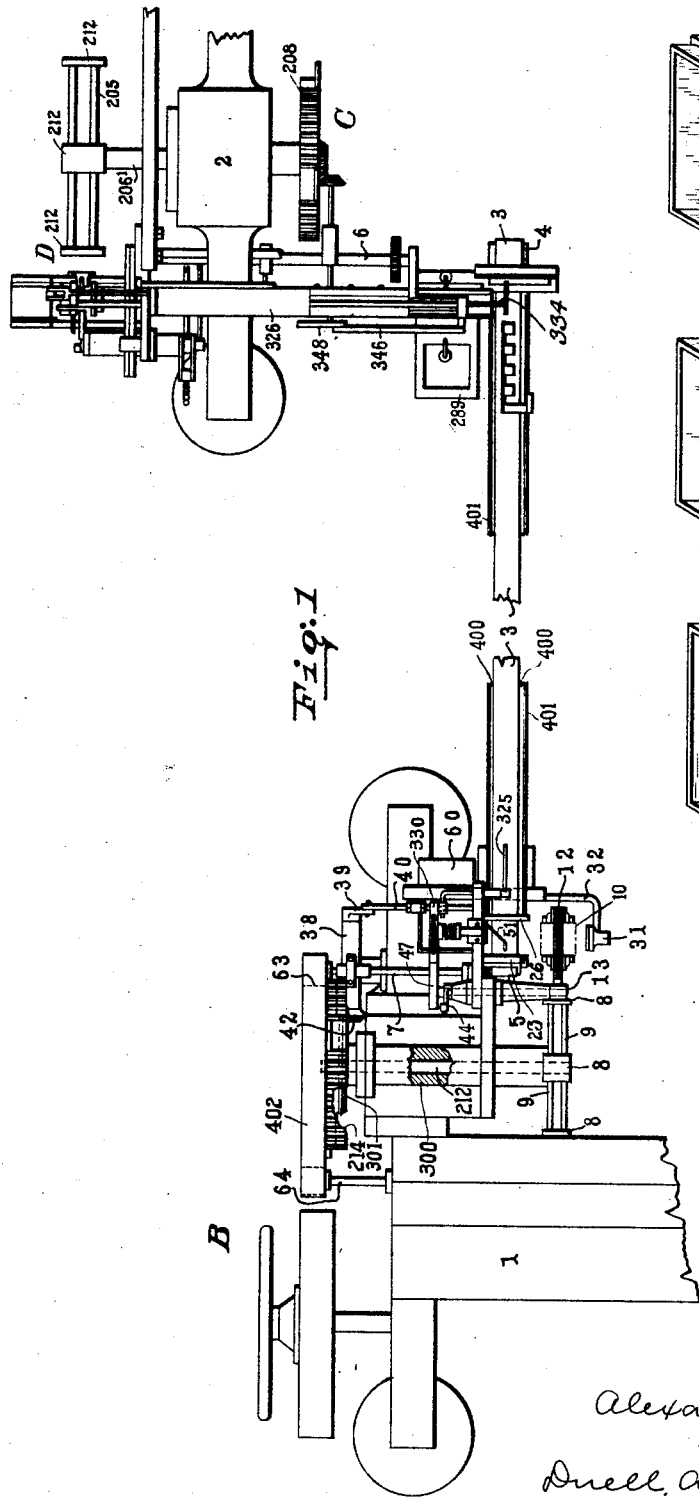
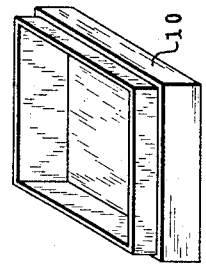
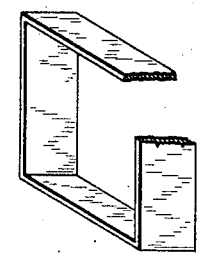
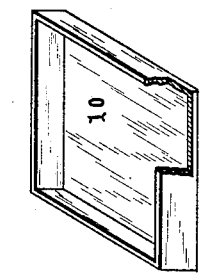
INVENTOR
Alexander H. Dreux
BY
Duell, Anderson & Duell
ATTORNEYS June 4, 1929.  A. H. DREUX  1,715,354
BOX MACHINE
Original Filed July 17, 1925  6 Sheets-Sheet 2
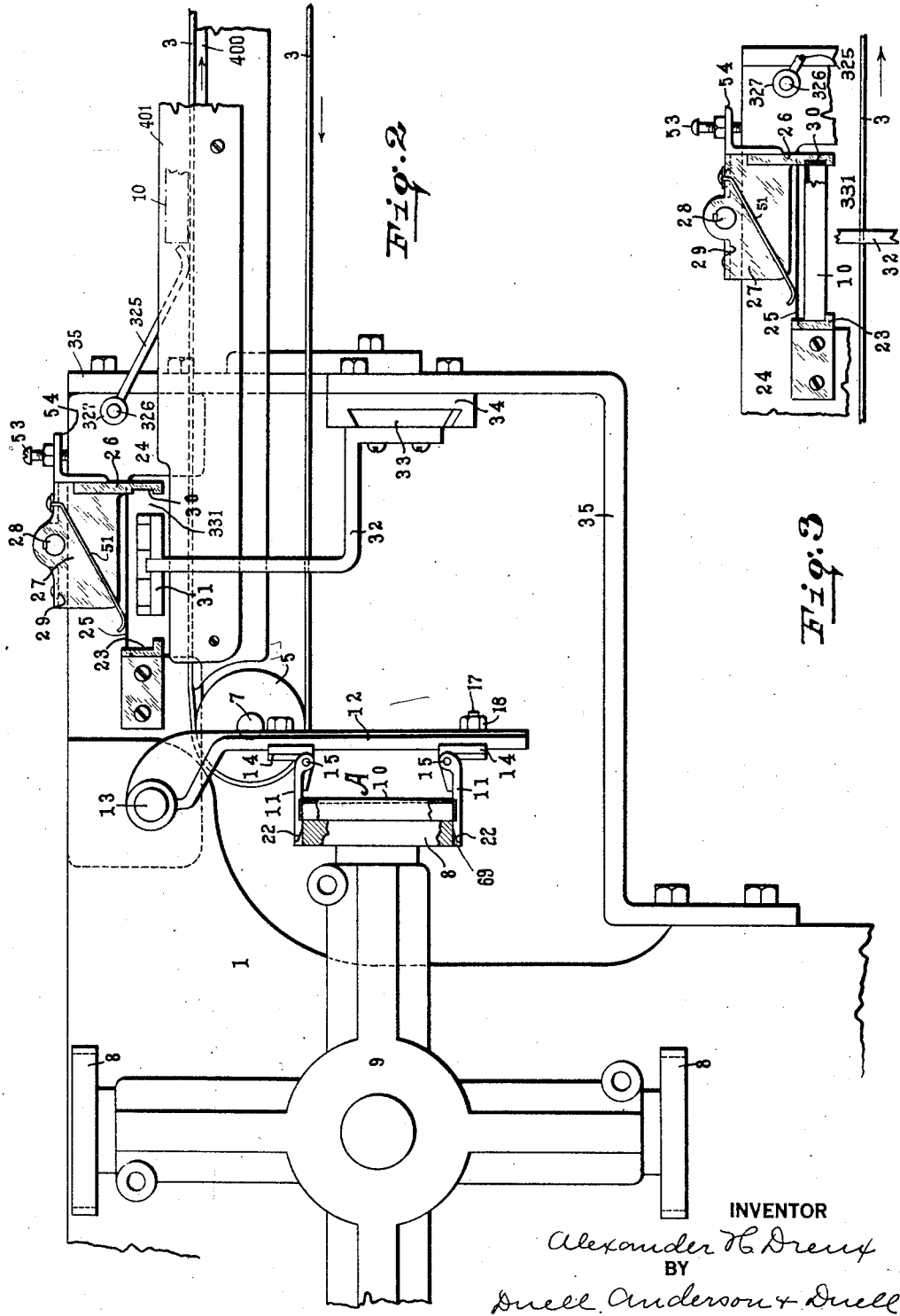
INVENTOR
Alexander H Dreux
BY
Duell Anderson & Duell
ATTORNEYS

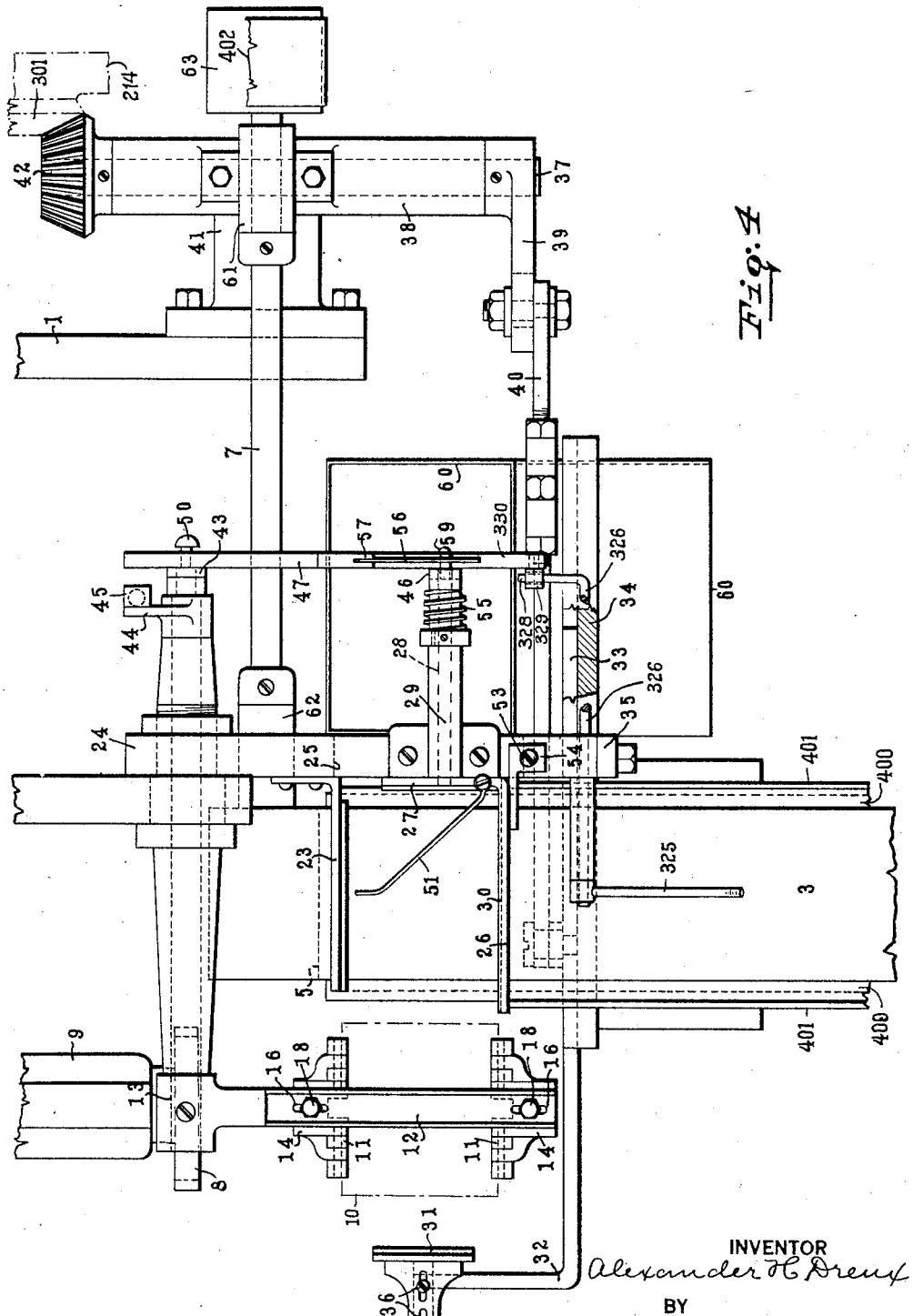

June 4, 1929.  A. H. DREUX  1,715,354
BOX MACHINE
Original Filed July 17, 1925  6 Sheets-Sheet 4

INVENTOR
Alexander H. Dreux
BY
Duell, Anderson & Duell
ATTORNEYS

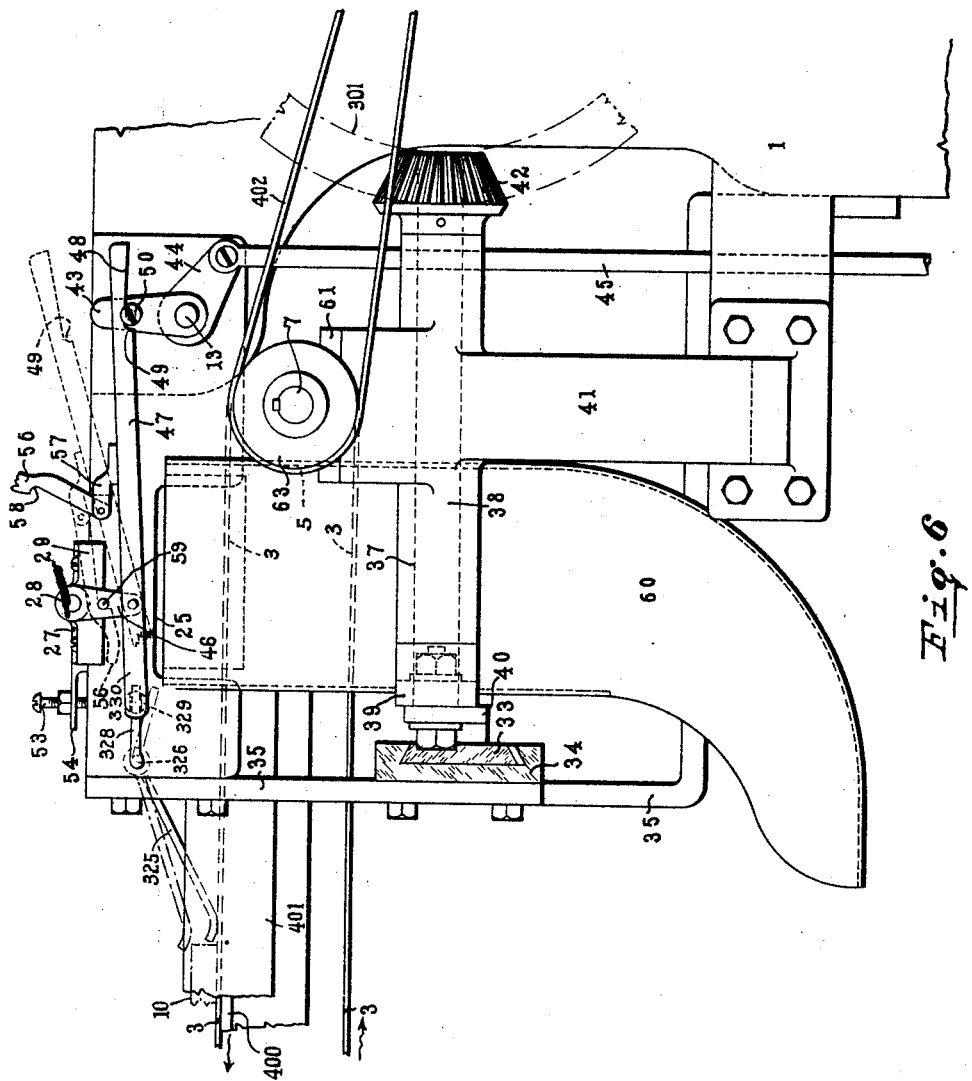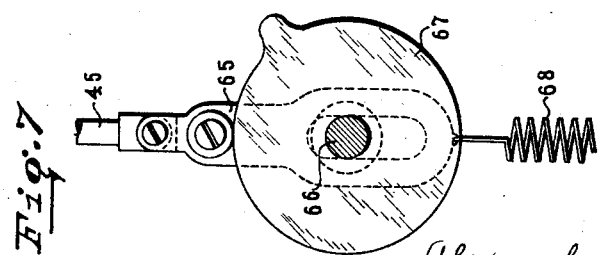

June 4, 1929.　　A. H. DREUX　　1,715,354
BOX MACHINE
Original Filed July 17, 1925　　6 Sheets-Sheet 6
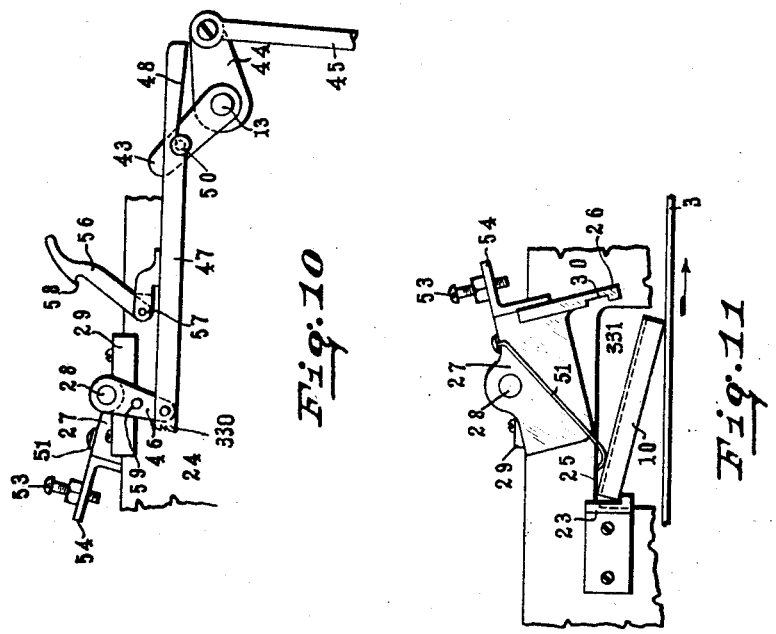
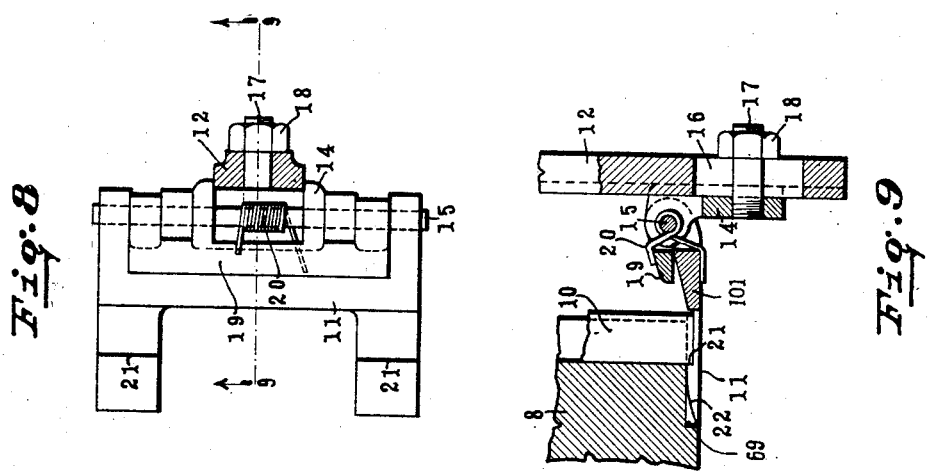
INVENTOR
Alexander H. Dreux
BY
Duell, Anderson + Duell
ATTORNEYS Patented June 4, 1929.

1,715,354

UNITED STATES PATENT OFFICE.

ALEXANDER H. DREUX, OF BUFFALO, NEW YORK, ASSIGNOR TO F. N. BURT COMPANY, LIMITED, OF TORONTO, CANADA, A CORPORATION OF ONTARIO, CANADA.

BOX MACHINE.

Application filed July 17, 1925, Serial No. 44,159. Renewed October 9, 1928.

This invention relates to machines for making paper box elements and with respect to its more specific features to machines for making box bases and box collars and assembling the bases and collars respectively to produce a collared box of rectangular outline. The invention includes as a prominent feature devices for automatically feeding and controlling paper box bases and similar articles.

One of the objects of the invention is the provision of a practical construction wherewith to control the orienting and feeding of box bases in respect to box collars so that bases having collars may be produced by combined operation of a base machine and a collar machine, without necessitating manual placement of either the bases or the collars for assembly purposes.

Another object of the invention is the provision of a relatively simple device for coordinating the operations of a base machine, a collar machine, and a device for feeding bases from the base machine to the collar machine, so that interruption of the base feed to the collar machine will not interfere with the continued operation of the base machine nor injure bases thereafter produced.

Another object of the invention is the provision of a practical arrangement whereby the above objects may be attained and wherewith, by simple manipulation, or automatically, either the base machine or the collar machine, or both, may continue to function one independently of the other, if desired.

Another object is the provision of a simple and practical device for automatically feeding box elements, as box bases, one after the other and wherewith interruption of normal feed may occur without injuring said elements.

Other objects of the invention will be in part obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a plan view of a machine in which the invention is embodied.

Fig. 2 is a side elevation, partly sectional, of a portion of the machine, illustrating the devices for stripping the bases from the formers on which the bases are made; also illustrating certain details of the base feeding and controlling mechanism, Fig. 3 is a detail elevation of the base retainer, with the base in position therein, Fig. 4 is a plan view of the base feeding and controlling devices of Fig. 3, Fig. 5 is an elevation, partly sectional, of the devices of Fig. 4, looking from the bottom of Fig. 4, the section being taken through the conveyor outside the plate 34, Fig. 6 is a rear elevation, looking to the left in Fig. 5, Fig. 7 is a detail of an operating part of the machine.

Figs. 8 and 9 are detail views of the article gripper jaws which strip the bases from the base machine, Fig. 10 is a detail rear view of devices for operating one of the retainer jaws, Fig. 11 is a view similar to Fig. 3 with the parts in a different position, Fig. 12 is a diagrammatic perspective view, partly broken away, of a base, the product of the base machine, Fig. 13 is a diagrammatic perspective view, partly broken away, of a collar, the product of the collar machine, and Fig. 14 is a perspective view of a collared box formed by telescopically assembling the collar in the base.

Referring now more specifically to the drawings, a practical embodiment of the invention is illustrated in Fig. 1, wherein are illustrated two article making machines associated with devices for assembling into a unitary article the product of each of said machines. The machine B at the left, Fig. 1, is adapted for making an open paper box called a base, and for brevity is called a "base machine". The illustration herein of the base machine is merely diagrammatic and only so much is diagrammatically shown as may be needed to understand the application of the invention. The base machine is similar to that disclosed in the U. S. patent to C. Holly, No. 1,158,211, patented October 26, 1915 and reference is made to said patent for a full disclosure of the base machine herein referred to. Herein a fragment of said patented base machine is diagrammatically illustrated in plan, at the left Fig. 1, and said machine includes the form carrier which is intermittently rotatable in an endless path in a vertical plane, said form carrier consisting of four radial arms 9, arranged at angles of 90°, each arm terminating in a rectangular mandrel, or former, 8. The hub of this form carrier is secured to one end of a horizontal shaft 212, which is journaled in the frame bearing 300, and has a mutilated gear wheel 214 secured to its opposite end. The gear wheel 214 is driven from the power shaft of the base machine through suitable transmission mechanism to cause it to rotate intermittently through succeeding intervals of 90°, as fully explained in said Patent No. 1,158,211. At each rest interval in said rotation one of the formers 8 arrives in position facing to the right Fig. 1, in which postion a completed box, or base, may be stripped, or removed, from the former by the jaws 11 of the carirer 12. Fixed to the inner side of the mutilated gear 214 is the bevel gear 301, which meshes with the bevel pinion 42, this latter pinion being given one complete rotation for each 90° movement of the gears 214 and 301.

On the frame of the base machine is journaled a carrier rock shaft 13, having a stiff arm 12 rocking therewith (Figs. 2, 4) and on this arm is mounted a pair of article gripper jaws which operate to strip, or pick, the boxes, or bases, from the formers 8 and carry them to a predetermined position where a pusher 31 acts to deliver the base from these jaws into a detainer, or retainer, composed of the pair of jaws 23 and 26, as more specifically hereinafter described. The gripper jaws 11, on the rock arm 12, have their inner end faces curved as at 22 (Fig. 9) for readily passing over the paper bases 10, on the formers to seize the bases, and the bases are received between the shoulders 21 and the body 101, of the jaws. Each gripper jaw 11 is pivoted on a pin 15 which is supported in a head 14 lying on one face of arm 12 and overlapping the sides of said arm, the head 14 being held on arm 12 by a nut 18 threaded on a stud 17 projecting from head 14 through slot 16 in the arm 12. By loosening the nuts 18, the gripper jaws may be adjusted toward or from each other on the arm 12. On the head 14 is the lug 19. A coil spring 20 surrounds the pin 15, one end of this spring lying against the lug 19 and the other end against the outer face of the jaw 11, so as to move the jaw on its pivot toward the lug 19, which latter limits the jaw movement. The construction of each of these article gripper jaws is similar. As they approach the former 8, they slide over the base 10 thereon until the shoulder 21 escapes the open edge of the base (Fig. 2). Movement of the gripper jaws away from former 8 results in carrying the base therewith to the predetermined position illustrated in Figs. 1 and 4, where the jaws are in alignment with the retainer jaws 23 and 26. The carrier shaft 13 has an arm 44 to which is coupled one end of the vertical connecting rod 45 (Fig. 6). Rod 45 is raised and lowered to rock the shaft 13 at properly timed intervals, as by means of a cam 67 rotatable with a cam shaft 66 of the base machine, the rod 45, having a strap 65 alongside the cam 66 and a roller kept in contact with the cam by spring 68. As each former 8 presents its finished base in the position indicated at A, Fig. 2, the arm 13 is rotated in one direction to apply the gripper jaws 11 to the base and then rotated in the opposite direction to carry the base to the position of Fig. 4, where it dwells until the base has been delivered to the retainer jaws. Thereupon the arm 12 again moves to strip a base from the next succeeding former. The cam 67 effects these movements of the arm 12. Any construction adapted to accomplish these movements of the shaft 13 may be used.

Journaled in bearing 38 on bracket 41 on the frame of the machine is the shaft 37 (Figs. 4 and 5) to which pinion 42 is fixed, shaft 37 also having a crank arm 39 adjustably connected to one end of connecting rod 40, the opposite end of this rod being pivoted to a plate 33 (Fig. 5) reciprocating in a guideway in a stationary piece 34 secured to the frame of the machine. Plate 33 has an upwardly directed arm 32 to which is adjustably attached a pusher 31, by means of the set screws 36. Pusher 31 includes a lip adapted to underlie the base between the two gripper jaws 11, and support the rear end of the base until it is effectively introduced between the retainer jaws 23 and 26. When the arm 12 is in the predetermined position indicated in Fig. 4, the pusher 31 moves in line between the jaws 11, first moving to the right to deliver the base to the retainer and then to the left to position to effect the next delivery, these movements being effected by the intermeshing gear 301 and pinion 42, hereinbefore mentioned.

The collars and the collar machine herein referred to are similar to those described in U. S. patent to Carlis Holly No. 1,253,690 patented January 15, 1918, to which reference is made for full explanation thereof. At the right in Fig. 1 at C is diagrammatically illustrated a portion of the collar machine of said Patent No. 1,253,690. Said collar machine comprises a series of four radially disposed former arms 205 at the end of each of which is a rectangular former 212 on which the collars are made, as fully explained in the collar machine patent. The former arms 205 are fastened to one end of a rotary shaft 206' journaled in bearings on the frame of the collar machine, said shaft being intermittently rotated for succeeding intervals of 90° from a power shaft (not shown), which communicates motion to the mutilated gear 208, all as fully explained in the collar machine patent. When the formers 212 arrive in the position indicated at D (Fig. 1), the collars have been completed thereon and are ready to be assembled with the bases from the base machine.

A procession of the bases is transported to the collar machine by the endless conveyor belt 3, whereupon a picker 334, reciprocated by a connecting rod 346 in turn operated by a disk wheel 348, picks the bases one by one from the conveyor belt 3, moves them to position over the glue tank 289 and thence into the downwardly open channel or guideway 326 along which latter they are advanced one by one to position in front of the former 212 at D, whereupon each base is applied to a respective collar on a former 212, all by mechanism as fully described in said Patent No. 1,253,690. In practice the base machine and the collar machine are driven each by its own motor and these two machines are operated simultaneously.

The conveyor 3 consists of an endless belt supported underneath by the frame pieces 400 (Fig. 5) and running between guides 401. The belt 3 passes around pulleys 4 and 5, and is driven from the pulley 5, which latter rotates with a shaft 7 having a belt pulley 63 driven from a shaft 64 through an intervening belt 402 (Figs. 1 and 4), the shaft 64 being continuously driven from the power shaft of the base machine by any suitable transmission mechanism.

Located directly above the belt 3 adjacent the base machine, is the base retainer, or detainer, hereinbefore referred to, comprising a pair of jaws 23 and 26 movable relative to each other to hold and release a base and, when released, to permit the base to drop therefrom onto the belt 3, with its open side facing said belt. In the present embodiment the retainer jaw 23 is fixed to the frame projection 24 and projects horizontally therefrom over the belt 3, being provided with a horizontal flange for supporting one edge of the base. The detainer jaw 26 is disposed opposite the jaw 23 and has a recess or channel 30 which accommodates and supports the opposite side of the base. The jaw 26 horizontally projects from a vertical plate 27 which is keyed to a rock shaft 28 journaled in a sleeve bearing 29 fastened to the top of the frame piece 24. One end of a coil spring 55 (Fig. 4) is secured to the bearing 29 and the other end to the shaft 28, the stress of this spring tending to cause the jaw 26 to move toward closed position relative to the jaw 23, in which position a base therebetween is supported and retained above the belt 3. When the jaw 26 moves toward open position in respect to the jaw 23, the base between these two jaws is released and permitted to drop onto the belt 3, this dropping movement being assisted, if desired, by a light tappet member, or spring, 51 carried by the plate 27 which will strike any delayed base and positively discharge it from between the jaws before the jaws again arrive at closed position. Carried by the jaw 26 is a bracket 54 provided with the stop 53 adapted to contact with the upper face of the frame piece 24 to arrest the approaching movement of said jaw in respect to its companion jaw 23. In the embodiment illustrated this stop comprises a screw threaded into the bracket and locked in adjusted position by a nut as illustrated.

To the retainer rock shaft 28 is keyed the arm 46, to which is pivoted a driven member, as the connecting rod 47 (Fig. 6) having face 48 adapted to rest on a pin 50 of a driving member, as the rock arm 43 which rocks with the shaft 13. Thus as the shaft 13 rocks the arm 43 is given periodic movement, and the pin 50 coacts with a shoulder 49 on the rod 47 to move the latter and thereby rock the shaft 28 in the direction to effect opening movement of the retainer jaw 26, the closing movement of said jaw being effected by the spring 55 before mentioned. To the rod 47 is attached a bracket 57 to which is pivoted a latch piece 56 having the recess 58 adapted to engage a pin 59 on arm 46, the construction being such that when the recess 58 is brought into engagement with the pin 59, the thrust shoulder 49 is held out of the sphere of action of the periodically actuating pin 50, as illustrated in dotted lines in Fig. 6, in which position the connecting rod is also displaced from the path of the pin 50. This manner of cutting out the actuation of the detainer jaw is effected by manual operation of the latch piece 56.

Means are also provided for automatically cutting out the operation of the detainer jaw 26, said means being adapted to be actuated by a box base on the conveyor belt 3 adjacent the detainer jaws. For this purpose there is provided a movable trip finger 325 (Figs. 4 and 5) comprising a slender rod coupled to actuate a transverse shaft 326 rotatably mounted in a sleeve 327 supported in the forward part of the frame piece 24. From one end of the shaft 326, the trip finger 325 extends downwardly into the path of and so as to be actuated by movement of the bases resting on the conveyor belt 3. At the opposite end, the shaft 326 has an arm or crank 328 loosely engaging an eye in a pin 329 projecting from the side of an extension 330 of the jaw operating rod 47.

Numeral 331 (Fig. 2) indicates an opening or passageway through the frame piece 24 in alignment with the inner end of the retainer jaws. Through this passageway the bases between said retainer jaws may be discharged laterally into the upper open end of a chute 60, from which they may fall into a suitable receptacle.

The operation will be understood from the foregoing but may briefly be described as follows:

Both the base machine and the collar machine are set in operation and operate, one to produce rectangular bases and the other to produce rectangular collars suitable for telescopic reception in the bases as clearly explained in the two patents hereinbefore mentioned. A former 8 of the base machine having arrived at the position A with a completed base on the end of such former, the carrier arm 12 rocks to apply the stripper and carrier jaws 11 to this base, the receding movement of the jaws stripping the base from the former 8 and carrying it upwardly into predetermined position in alignment with the retainer jaws, this latter position being illustrated in Fig. 4. Thereupon, while the the stripper jaws remain in their upper position, the pusher 31 moves toward the retainer jaws and between the stripper jaws, the lip of the pusher taking under the open edge of the paper base, the pusher delivering said base to the retainer by sliding it out of the stripper jaws into position between the retainer jaws 23 and 26, these latter slightly gripping the base so as to bring it to rest as soon as the delivery movement of the pusher is completed. The base will now be between the retainer jaws and immediately over the conveyor belt 3. Thereupon the pusher recedes and thereafter the stripper jaws descend for a succeeding base. The retainer jaw 26 will now make an opening movement and permit the base in the retainer to drop onto the belt 3 by which latter it will be carried to the collar machine and assembled in telescopic relation with a collar as before explained. A procession of bases may accumulate on the conveyor belt 3 and to such an extent as to interfere with the proper positioning of subsequent bases on the belt 3. When this happens, one or more bases of this procession will be arrested so as to maintain the trip finger 325 in elevated position with the result that the connections from this trip finger to the retainer jaw operating means will be so positioned that the connecting rod 47 will be held in elevated position as illustrated in dotted lines in Fig. 6, in which position periodic movement of the actuating pin 50 will have no actuating effect on the rod 47. The spring 55 will then hold the jaw 26 in closed position, any box between said jaws being held from being discharged onto the conveyor belt. When a subsequent box is delivered to the retainer by the pusher 31, it will eject the preceding box from the retainer jaws through the opening 331 into the chute 60, thus causing the bases to be shunted from delivery to the feeding conveyor belt 3, this shunting being automatically effected when a base is arrested beneath the trip finger 325. When the movement of the bases on the belt 3 is not arrested, they merely rock the trip finger and the parts connected thereto, without keeping the thrust shoulder on the rod 47 out of the sphere of action of the periodically operating pin 50.

It will be observed that the arrangement for operation of the stripper jaws 11 and the retainer jaws is such that the bases are delivered from the jaws 11 in a direction transverse to that of their discharge from the retainer jaws; also it will be noted that the pusher 31 delivers the bases between the retainer jaws and also discharges the bases from these jaws toward the chute in a direction transverse to that of the discharge of bases toward the conveyor belt 2. Thus the retainer jaws provide for operative discharge of bases in different directions, one toward the belt and the other in a direction to shunt the bases from the belt.

Also it will be noted that in the present embodiment, in outward movement of the retainer jaw 26, the side of the box base adjacent thereto descends onto the moving belt 3, so that the box base assumes a slanted position as illustrated in Fig. 11, and the moving belt 3 draws this base from the base supporting flange of the retainer jaw 23. In practice the belt is preferably so spaced below the retainer jaws that the side of the box base adjacent jaw 26 will reach the belt before such angular movement of the base as might cause it to turn completely over. In this wise the bases will rest on the belt open side down as they were in the retainer, and be in proper relative position to be pasted inside and applied to the paper collars by the collar machine, as fully explained in said collar machine patent. In the present embodiment the dropping of the base from the retainer jaws is through a distance slightly greater than the height of a base.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In an apparatus of the character described, in combination, a base machine, a collar machine, means to actuate said machines simultaneously, and means to assemble bases from the base machine in telescopic relation with collars on said collar machine to form collared boxes including a device for feeding a procession of bases to said collar machine, means for delivering bases from said base machine to said feeding device, and means, adapted to be actuated by arrest of a base in predetermined position relative to said feeding device, to cause the bases to be shunted from delivery to said feeding device by said delivering means.

2. In an apparatus of the character described, in combination, a base machine, a collar machine, means to actuate said machines simultaneously, and means to assemble bases from the base machine in telescopic relation with collars on said collar machine to form collared boxes including a device for feeding a procession of bases to said collar machine, means for delivering bases from said base machine to said feeding device, and means adapted to be manually actuated to cause said delivering means to shunt the bases from delivery to said feeding device.

3. In an apparatus of the character described, in combination, a base machine, a collar machine, means to actuate said machines simultaneously, and means to assemble bases from the base machine in telescopic relation with collars on said collar machine to form collared boxes including an endless belt conveyor for supporting and feeding a procession of bases to said collar machine, a base detainer above said belt comprising a pair of jaws relatively movable to hold and release a base and, when released, to permit the base to drop onto said belt, means to move said jaws toward and from each other, and means successively to deliver bases from said base machine between said detainer jaws.

4. In an apparatus of the character described, in combination, a base machine, a collar machine, means to actuate said machines simultaneously, and means to assemble bases from the base machine in telescopic relation with collars on said collar machine to form collared boxes including an endless belt conveyor for supporting and feeding a procession of bases to said collar machine, a base detainer above said belt comprising a pair of jaws relatively movable to hold and release a base and, when released, to permit the base to drop onto said belt, means to move said jaws toward and from each other, means successively to deliver bases from said base machine between said detainer jaws, and manual means adapted to cut out the relative movement of said jaws from each other.

5. In an apparatus of the character described, in combination, a base machine, a collar machine, means to actuate said machines simultaneously, and means to assemble bases from the base machine in telescopic relation with collars on said collar machine to form collared boxes including an endless belt conveyor for supporting and feeding a procession of bases to said collar machine, a base detainer above said belt comprising a pair of jaws relatively movable to hold and release a base and, when released, to permit the base to drop onto said belt, means to move said jaws toward and from each other, means successively to deliver bases from said base machine between said detainer jaws, and means, adapted to be actuated by arrest of a base in predetermined position on said belt, to cut out the actuation of said jaws by said jaw moving means.

6. In an apparatus of the character described, in combination, a base machine, a collar machine, means adapted to actuate said machines simultaneously, and means to assemble bases from the base machine in telescopic relation with collars on said collar machine to form collared boxes including an endless belt conveyor for supporting and feeding a procession of bases to said collar machine, a pair of jaws overlying said belt having approaching and receding movements relative to each other, adapted when closed, to support a base therebetween and, when open, to release the base for discharge onto said belt, automatically operative means to effect the opening and closing movements of said jaws, means, adapted to be actuated by a base on said belt adjacent said jaws, to prevent said automatically operative means effecting opening movement between said jaws, and means adapted to deliver bases from said base machine in succession to said jaws in a direction transverse to that of said discharge.

7. In an apparatus of the character described, in combination, a base machine, a collar machine, means adapted to actuate said machines simultaneously, and means to assemble bases from the base machine in telescopic relation with collars on said collar machine to form collared boxes including an endless belt conveyor for supporting and feeding a procession of bases to said collar machine, a pair of jaws overlying said belt having approaching and receding movements relative to each other, adapted when closed, to support a base therebetween and, when open, to release the base for discharge onto said belt, automatically operative means to effect the opening and closing movements of said jaws, means, adapted to be actuated by a base on said belt adjacent said jaws, to prevent said automatically operative means effecting opening movement between said jaws, and means adapted to deliver bases from said base machine in succession to said jaws in a direction transverse to that of said discharge, said jaws being constructed and arranged to permit bases to be discharged from therebetween in said last mentioned direction.

8. In an apparatus of the character described, in combination, a pair of jaws having opening and closing movements relative to each other adapted, when closed, to support an article therebetween and, when open, to release the article for discharge therefrom in a predetermined direction, automatically operative means to effect said opening and closing movements, and means adapted to deliver articles in succession between said jaws in a direction transverse to that of said discharge.

9. In an apparatus of the character described, in combination, a pair of jaws having opening and closing movements relative to each other adapted, when closed, to support an article therebetween and, when open, to release the article for discharge therefrom in a predetermined direction, automatically operative means to effect said opening and closing movements, and means adapted, when said jaws are closed, to deliver articles between said jaws and discharge articles from said jaws in a direction transverse to that of said first mentioned discharge.

10. In an apparatus of the character described, in combination, a pair of jaws having opening and closing movements relative to each other adapted, when closed, to support an article therebetween and, when open, to release the article for discharge therefrom in a predetermined direction, automatically operative means to effect said opening and closing movements, a conveyor for receiving and transporting articles discharged from said jaws in said predetermined direction, and manually operable means adapted to be set to prevent said automatically operative means effecting opening movement between said jaws.

11. In an apparatus of the character described, in combination, a pair of jaws having opening and closing movements relative to each other adapted, when closed, to support an article therebetween and, when open, to release the article for discharge therefrom in a predetermined direction, automatically operative means to effect said opening and closing movements, a conveyor for receiving and transporting articles discharged from said jaws in said predetermined direction, and means, disposed to be actuated by an article on said conveyor, to prevent said automatically operative means effecting opening movement between said jaws.

12. In an apparatus of the character described, in combination, a pair of jaws forming an article retainer open downwardly and open at opposite ends, a rock shaft on which one of said jaws is supported for opening and closing movement relative to the other jaw, means adapted to rock said shaft at predetermined intervals to effect opening and closing movements between said jaws including a driving and driven member mounted for displacement relative to each other to and from position to rock said shaft, a conveyor disposed below said jaws to receive and transport articles downwardly discharged from said jaws, a trip disposed to be actuated by movement of the articles on said conveyor, connections from said trip to effect said displacement, and means adapted to deliver articles in succession between said jaws through one of said open ends.

13. In an apparatus of the character described, in combination, a pair of jaws forming an article retainer open downwardly and open at opposite ends, a rock shaft on which one of said jaws is supported for opening and closing movement relative to the other jaw, a power driven periodically movable actuator, an arm on said rock shaft and a connecting rod coupled to said arm having a thrust shoulder adapted to be engaged by said actuator to effect rocking of said shaft in one direction.

14. In an apparatus of the character described, in combination, a pair of jaws forming an article retainer open downwardly and open at opposite ends, a rock shaft on which one of said jaws is supported for opening and closing movement relative to the other jaw, a power driven periodically movable actuator, an arm on said rock shaft and a connecting rod coupled to said arm having a thrust shoulder adapted to be engaged by said actuator to effect rocking of said shaft in one direction, and means including a latch on said rod for holding said rod out of the path of said actuator.

15. In an apparatus of the character described, in combination, a pair of jaws forming an article retainer open downwardly and open at opposite ends, a rock shaft on which one of said jaws is supported for opening and closing movement relative to the other jaw, a power driven periodically movable actuator, an arm on said rock shaft and a connecting rod coupled to said arm having a thrust shoulder adapted to be engaged by said actuator to effect rocking of said shaft in one direction, a conveyor disposed below said jaws to receive and transport articles downwardly discharged from said jaws, a movable trip finger in the path of articles on said conveyor, a trip shaft connected to be rotated by movement of said trip finger, and connections between said trip shaft and said connecting rod whereby actuation of said finger by an article on said conveyor displaces said connecting rod from the path of said actuator.

16. In an apparatus of the character described, in combination, a frame, a carrier rock shaft journaled on said frame, an arm on said carrier rock shaft having a pair of article gripper jaws spring pressed toward each other, power actuated means for rocking said carrier rock to dispose said gripper jaws periodically at predetermined position, an article pusher supported by said frame and reciprocal through the space between said gripper jaws at said predetermined position, a pair of jaws forming an article retainer open downwardly and open at opposite ends in line with the path of said pusher, a retainer rock shaft on said frame and on which one of said retainer jaws is supported for opening and closing movement relative to the other retainer jaw, means adapted to rock said retainer shaft at predetermined intervals to effect opening and closing movements between said retainer jaws including a driving and a driven member mounted for displacement relative to each other to and from position to rock said retainer shaft, a conveyor disposed below said retainer jaws to receive and transport articles downwardly discharged from said jaws, a trip disposed to be actuated by movement of the articles on said conveyor, and connections from said trip to effect said displacement.

17. In an apparatus of the character described, in combination, a pair of jaws having opening and closing movements relative to each other adapted, when closed, to support an article therebetween and, when open to release the article for discharge therefrom in a predetermined direction, means to deliver articles between said jaws, automatically operative means to effect said opening and closing movements, one of said jaws having an article supporting flange, and a conveyor on which the article is discharged from said jaws, movable to draw the article from said flange when the jaws are open.

18. In an apparatus of the character described, in combination, a pair of jaws having opening and closing movements relative to each other adapted, when closed, to support an article therebetween and, when open, to release the article for discharge therefrom in a predetermined direction, means to deliver articles between said jaws, automatically operative means to effect said opening and closing movements, one of said jaws having an article supporting flange, a conveyor on which the article is discharged from said jaws, movable to draw the article from said flange when the jaws are open, and means, disposed to be actuated by an article on said conveyor, to prevent said automatically operative means effecting opening movement between said jaws.

19. In an apparatus of the character described, in combination, a pair of jaws having opening and closing movements relative to each other adapted, when closed, to support an article therebetween and, when open, to release the article for discharge therefrom in a predetermined direction, means to deliver articles between said jaws, automatically operative means to effect said opening and closing movements, one of said jaws having an article supporting flange, and a conveyor on which the article is discharged from said jaws, movable to draw the article from said flange when the jaws are open, said conveyor being beneath said jaws and at such a distance therefrom that one side of the article may rest on said conveyor while the opposite side is upheld by said flange in the operation of discharge.

20. In an apparatus of the character described, in combination, a pair of jaws having opening and closing movements relative to each other adapted, when closed, to support an article therebetween and, when open, to release the article for discharge therefrom in a predetermined direction, means to deliver articles between said jaws, automatically operative means to effect said opening and closing movements, one of said jaws having an article supporting flange, a conveyor on which the article is discharged from said jaws, movable to draw the article from said flange when the jaws are open, and means, disposed to be actuated by an article on said conveyor, to prevent said automatically operative means effecting opening movement between said jaws, said conveyor being beneath said jaws and at such a distance therefrom that one side of the article may rest on said conveyor while the opposite side is upheld by said flange in the operation of discharge.

In testimony whereof I affix my signature.

ALEXANDER H. DREUX.